United States Patent
Yatskov et al.

(10) Patent No.: US 6,505,387 B1
(45) Date of Patent: Jan. 14, 2003

(54) FLEXIBLE FASTENER

(75) Inventors: Alexander I. Yatskov, Kenmore, WA (US); Thomas A. Auciello, Seattle, WA (US); Thomas F. Zimmerman, Snohomish, WA (US); Douglas Patrick Kelley, Redmond, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/669,152

(22) Filed: Sep. 25, 2000

(51) Int. Cl.⁷ .............................................. A44B 21/00
(52) U.S. Cl. ............................ 24/626; 24/615; 24/618; 24/298
(58) Field of Search .......................... 24/289, 615, 618, 24/626, 683, 685, 694, 702; 403/294, 331; 292/80, 81, 87, DIG. 61; 267/169, 170, 179; 16/85; 361/724–727, 736, 740, 741

(56) References Cited

U.S. PATENT DOCUMENTS

| | | | | |
|---|---|---|---|---|
| 763,175 A | * | 6/1904 | Gold | 267/170 X |
| 1,462,925 A | * | 7/1923 | Wilburger | 267/179 X |
| 1,741,942 A | * | 12/1929 | Kellogg | 292/87 X |
| 1,903,669 A | * | 4/1933 | Greene | 292/87 |
| 1,922,676 A | * | 8/1933 | Greene | 292/87 |
| 1,936,232 A | * | 11/1933 | Greene | 292/87 |
| 2,700,788 A | * | 2/1955 | Hennelly | 267/179 |
| 3,025,559 A | * | 3/1962 | Basinger | 16/85 |
| 3,137,026 A | * | 6/1964 | Flam | 16/85 |
| 3,889,992 A | * | 6/1975 | Shelton | 292/87 |
| 4,549,859 A | * | 10/1985 | Andrione et al. | 267/179 X |
| 5,032,952 A | * | 7/1991 | Cooke et al. | 361/740 X |
| 5,872,701 A | * | 2/1999 | Hayden, Sr. et al. | 361/741 X |
| 5,928,024 A | * | 7/1999 | Ming-Huang | 361/741 X |
| 5,973,926 A | * | 10/1999 | Sacherman et al. | 361/740 X |
| 6,098,970 A | * | 8/2000 | Lowe | 267/179 |
| 6,147,873 A | * | 11/2000 | Huang | 361/741 X |
| 6,362,978 B1 | * | 3/2002 | Boe | 361/825 |

FOREIGN PATENT DOCUMENTS

GB 2 230 236 A * 10/1990

* cited by examiner

Primary Examiner—Robert J. Sandy
Assistant Examiner—Ruth C. Rodriquez
(74) Attorney, Agent, or Firm—Seed IP Law Group PLLC

(57) ABSTRACT

A flexible fastener having a body formed from tightly coiled wire, with a head affixed to one end of the body, the other end being attached to a first structure, which may be a component of a computer system. The fastener functions by maintaining the position of a first structure adjacent to a second structure, which is provided with a slotted flange. The head end of the fastener is lifted and allowed to fall back such that it drops into the slot in the flange, with the head on the side opposite from the first structure, thus maintaining the correct alignment. The fastener may be threaded into a threaded aperture in the first structure, as a means of effecting the attachment to the first structure. The length of the fastener may be adjusted for optimum alignment by threading the fastener to a desired depth in the aperture. A locknut is provided, to lock the fastener to maintain a desired length.

34 Claims, 3 Drawing Sheets

FLEXIBLE FASTENER

TECHNICAL FIELD

The present invention relates to mechanical fasteners, particularly those used to maintain computer components and modules in physical contact.

BACKGROUND OF THE INVENTION

In modern computer systems, typically there are components which must be fastened together for proper operation. These may range in size, from tens or hundreds of grams to many kilograms. Screws are commonly used to fasten such components to the main structure, or frame, of the computer. In large systems, there are generally many components, and they can be very massive, sometimes exceeding thirty kilograms.

The use of screws as fasteners presents several problems. The labor involved in aligning and inserting all the screws in a large and complex system can add a significant cost to the assembly of the system, and to the difficulty of servicing the system. With the use of screws, once a component is fixed in place, it remains inflexible. If the contacts on the component and the main structure are not perfectly aligned, damage may result.

Large computer systems, employing multiple subsystems or modules are commonly subject to mechanical or thermal expansion. Further, the presence of liquid coolant lines and manifolds can cause shifting as lines are pressurized. As a result, structural stress is a significant concern. Assembling a system without fully tightening screws until the stresses are equalized and then performing a final tightening is problematic, because it requires additional time on the part of the assembly technician to return and retighten each screw, it also requires extra vigilance, since it may not be possible by visual inspection alone to determine whether a screw is tight. Loose screws may eventually drop out due to varying tension or vibration, causing catastrophic failures in expensive systems. Furthermore, some stresses cannot be equalized or are recurrent as the system cycles.

A further problem is that specialized tools are required to engage screws or other fasteners, and to ensure the correct amount of torque when fastened.

SUMMARY OF THE INVENTION

According to the principles of the present invention a fastener is provided that can be engaged and disengaged quickly and easily. The fastener holds components in their proper position firmly, while allowing some limited movement after assembly. The fastener is used to retain a circuit board module within a frame during operation of a computer system.

The fastener has two main components: a body and a head. The body is in the form of a spring, using tightly coiled steel wire. The head is in the form of a knob or nut affixed to one end of the body. The other end of the body is attached to the frame of the system. The module is provided with a slotted flange in a position that corresponds to the location of the fastener, such that, when the module is correctly positioned in the frame, the fastener is in proper alignment with the slot in the flange.

With the structures positioned correctly, the fastener is flexed in a direction perpendicular to the longitudinal axis of the fastener, and then released, such that it engages the slot with the head.

The spring characteristics of the fastener permit some limited movement between the two structures, while the tensile strength of the spring holds the module in the proper position within the frame.

BRIEF DESCRIPTION OF THE DRAWINGS

The characteristics and the advantages of the present invention will be evident from the following detailed description of one of its forms of practical application, illustrated as a non-limiting example in the attached figures.

DETAILED DESCRIPTION OF THE INVENTION

Figure 1:
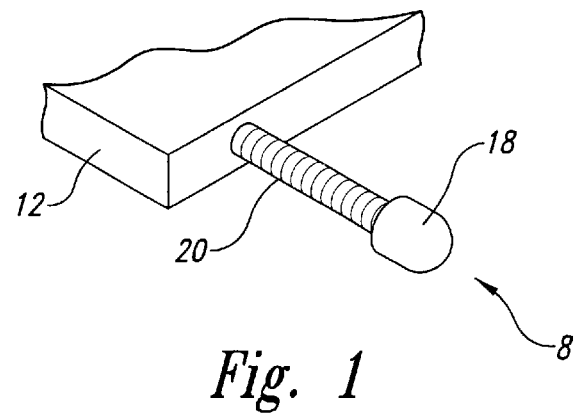
FIG. 1 shows an isometric view of a fastener, affixed to a frame.

A first embodiment of the present invention is shown in FIG. 1. The present invention includes a fastener 8. The fastener 8 comprises a body 20 and a head 18. The body 20 of the fastener is a spring formed using tightly coiled wire. The head 18 of the fastener is an acorn nut. The head is affixed to a first end of the body. The fastener is attached at a second end 21 of the body 20 to a frame 12 (see FIG. 3).

Figure 2:
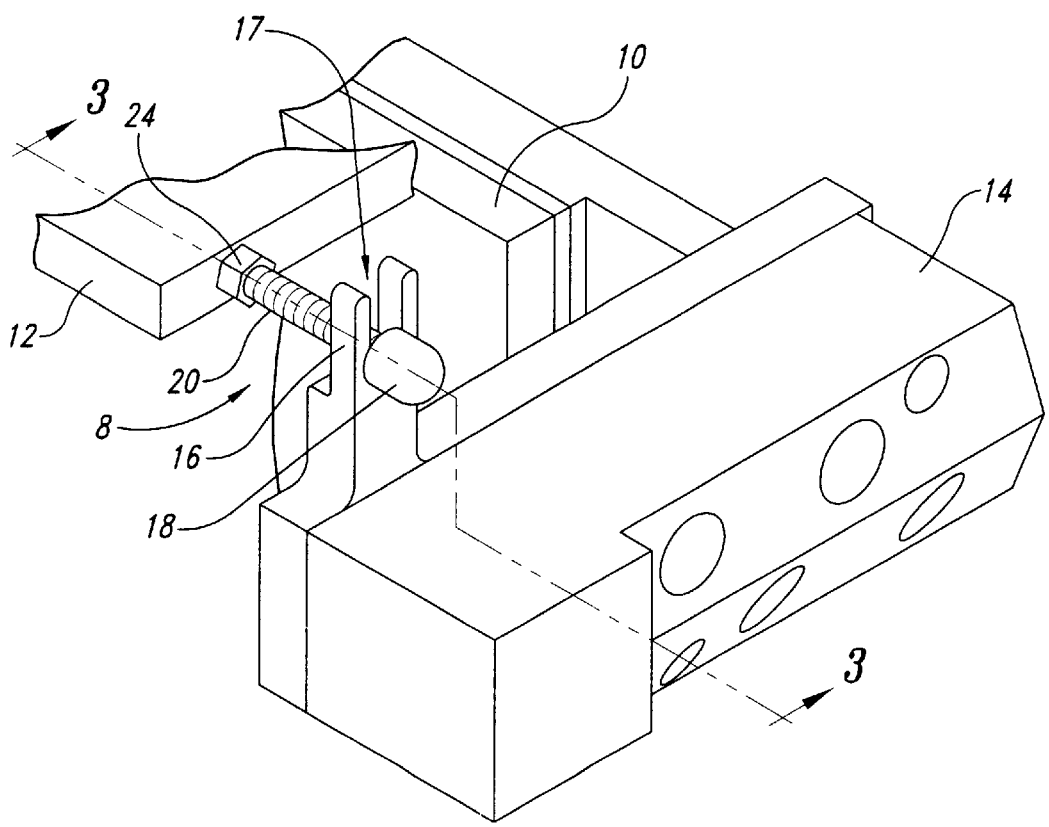
FIG. 2 shows the fastener in the frame, holding a circuit board in correct alignment.

FIG. 2 shows the fastener 8 and frame 12 in alignment with a module 14 having a flange 16. The flange has a slot 17. The slot 17 has a width greater than the diameter of the body 20 of the fastener, but less than the width of the head 18 of the fastener. The module 14 is coupled to a circuit board 10 of the computer for holding the board 10 in its proper position within the computer system.

With the frame 12 and the board 10 in correct alignment, the body 20 of the fastener 8 rests within the slot 17 of the flange 16, while the head 18 engages the flange 16, maintaining that correct alignment of the board 10 within the computer. Because of the flexible nature of the fastener 8, there is possible a small amount of movement between the frame 12 and the board 10 without compromising the integrity of the fastener 8 or causing damage to board 10.

The spring which comprises the body 20 of the fastener 8 is constructed having a selected stiffness and strength in the coil. The stiffness in the longitudinal direction is selected to be high, approaching that of a solid metal fastener. Thus, the spring body 20 can be extended along its longitudinal axis 23 when a known amount of force is applied to stretch the spring beyond its compressed, at rest state. The amount of force required to extend the spring is selected to be relatively high, with a high spring stiffness so as to hold the spring in the compressed state with a high amount of force. The amount of force is selected to be that which is desired to act as a fastener for retaining the module 14 in the frame 12. If a higher amount of force is desired, a stiffer spring force is used. Alternatively, if a somewhat looser connection is required, the stiffness of the spring is lower. Accordingly, the strength with which the module is pulled in towards the frame and held against the frame is selectable based on the design parameters of the spring which makes up the body 20 of the fastener. The stiffness is selected so as to be sufficiently great that the module 14 will be held tightly into the frame under all normal working conditions. It is sufficiently loose that the head 18 can be moved slightly, along longitudinal axis 23, if a certain force is provided.

The use of the spring for the body 20 provides advantages in retaining the module 14 firmly inside the frame 12 while permitting some slight movement of the frame 12 with respect to the module 14. As will be appreciated, with a stiff spring, the strength of the fastener approaches that of a rigid, single metal shaft fastener so as to hold the module in position. During operation, if the module 14 and frame 12 move slightly with respect to each other, the spring may extend somewhat so as to permit slight flexing between the two components. This may occur, for example, based on differing thermal coefficients of expansion, circulation of cooling fluid, slight flexure of the frame, or other reasons. When the module 14 moves slightly with respect to the frame 12, the spring will be slightly extended. This movement is also helpful in the assembly or service of large components where minute adjustments become necessary to properly effect the connections of precision electronic contacts. The fastener permits continual adjustments due to expansion, vibration or movement while maintaining position for proper operation.

When the board is displaced the force that the spring places on the module 14 will increase, thereby further increasing the holding power of the fastener 8 to retain the module 14 in position. If the module is moved even further away, the spring will have a corresponding reaction to increase the force exerted and pull the module back into position. Thus, the flexible fastener is structured so as to increase the holding force proportional to the movement of module 14 with respect to the frame 12. The fastener therefore will have a tendency to pull the module 14 back into its proper position while permitting some slight movement over the long term operation of the computer.

The use of a spring for the body 20 of the fastener may be compared to the use of a metal screw for retaining the module in position. With a metal screw used as the fastener, the tightness of the module being held in the frame is preset, based on the torque on the screw. If the screw is left loose, then the module 14 may easily move back and forth between the frame and the head of the screw without being held firmly in place, and without preventing or damping vibration. Further, vibration may cause a loose screw to fall out during operation, with disastrous effect. If a fairly tight torque is used to retain the module 14 in a preset, firm condition, this has the disadvantage of prohibiting much relative movement between the module 14 and the frame 12. Further, if the module 14 moves slightly, rather than increasing the force with which the module is held in position, it will instead have the tendency to weaken the force or break the fastener since the screw does not have the capacity for adjusting the force with which it holds an object in position based on relative movement of the objects. In addition, any relative movement between the two will cause stress to be placed on the module or on the frame, creating increased strain at critical locations. Finally, the tightness of a screw cannot be determined visually.

On the other hand, the fastener of the present invention will accept the additional strain within the body of the fastener itself rather than placing undue strain on either the module 14 or the frame 12. Thus, the integrity of the overall structure is maintained while still providing an increase in the compressive forces to bring the module back into its proper position should there be slight movement between the module 14 and the frame 12, and to retain the module in the proper position at all times.

The use of a spring for the body 20 of the fastener has the further advantage that it is flexible in the directions perpendicular to the longitudinal axis. The spring can be made extremely stiff in the longitudinal axis so as to act as a firm retaining fastener while being loose in a perpendicular direction to permit ease of insertion into the module for assembly and disassembly as explained in more detail elsewhere herein.

The wire diameter and coil windings of the spring are selected to provide a desired pitch so as to simulate the thread pitch of a threaded fastener. As is well known, a screw having a thread thereon is designed with a desired pitch from one thread to the other along the length of the shaft, as well as a desired depth between the individual threads and other features which comprise a screw, such as a standard machine screw. Similarly, the diameter of the wire making up the coils of the spring is selected to create a threaded body having the desired properties acting as the threads on a screw. The coils of the spring act as the threads in the fastener so that the fastener itself approximates that of a threaded screw in many respects. The coils of the fastener may be wound in a right hand or left hand direction as necessary to accommodate the specific requirements of a particular application.

Figure 3:
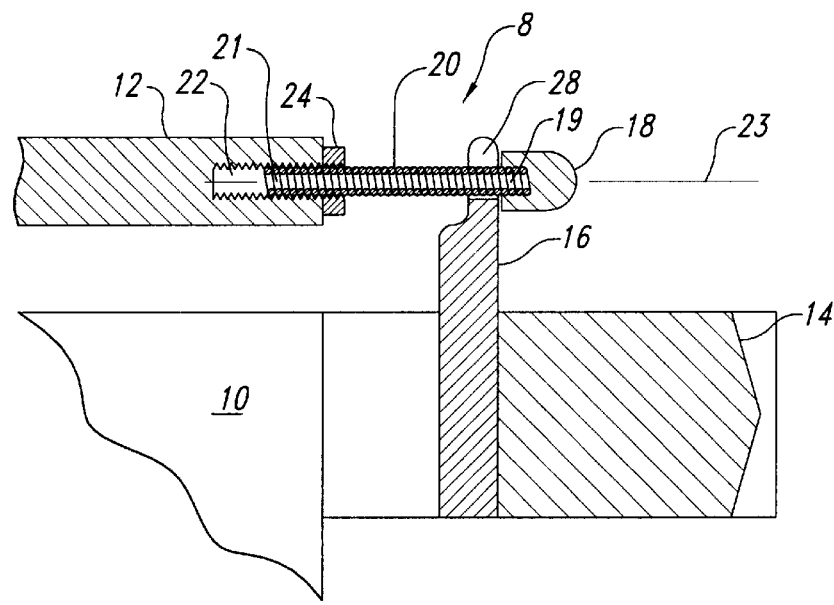
FIG. 3 shows a cross section of the structure of FIG. 2, taken generally along lines 3—3.

FIG. 3 shows a cross section view of the body of the fastener and its attendant flange 16. In this embodiment, the frame 12 is provided with an aperture 22. The aperture has internal threads 27, as shown. The diameter and the pitch of the threads 27 in the aperture match the diameter and coils of the body 20 of the fastener 8, such that the fastener may be screwed into the aperture 22.

The length of the fastener is determined by screwing the threads the correct distance into the aperture 22. The aperture 22 is created by tapping a threaded hole in the frame 12. The depth of the aperture is selected to be sufficient to exceed the maximum depth that the fastener might be required to occupy. A locknut 24 is provided to lock the fastener in place at a desired position.

The head 18 of the fastener 8 is an acorn nut or other device having internal threads. It is threaded onto the body 20 of the fastener in a manner similar to the way the locknut 24 is threaded onto the fastener. The head is preferably threaded onto the first end 19 of the body during assembly of the fastener and is held in a fixed position. Preferably, when an acorn nut is used for the head 18 of the fastener, the threads have a selected depth so that the fastener is tightly attached to the head with the threads abutting in full contact with the end wall of the internal aperture in the acorn nut.

In other embodiments of this invention, the body may be affixed to the frame and the head via other methods, which may include the use of adhesives, crimping and welding. In cases where the thickness of the frame is insufficient to allow a threaded aperture, a nut may be welded onto the frame to serve the same function. A bolt may be used to project from the frame, onto which the fastener is screwed. These and other means of attachment are considered to be within the scope of this invention.

To install the fastener, the manufacturer might use the following method: Create a threaded aperture in the frame, of appropriate diameter and pitch to match the diameter and thread pitch of the fastener. Place a measuring device having a thickness that corresponds to the desired length of the fastener. Place the measuring device against the frame and adjacent to the aperture. The measuring device may be a simple spacer bar that is placed next to the frame. The fastener is threaded down until the head makes contact with the spacer. The fastener is now the proper length for engaging the module 14. The locknut is then rotated until it makes contact with the frame. The locknut is tightened sufficient to apply adequate tension to prevent the fastener from moving or rotating further under normal operating conditions.

Other methods might be devised to install the fastener, and any method that serves to install the fastener so that it fulfills the required design parameters is considered to fall within the scope of this invention.

The composition and materials and methods used in the manufacture of the fastener may be selected to provide the necessary strength characteristics and degree of stiffness or tension required for a particular application.

Figure 4:
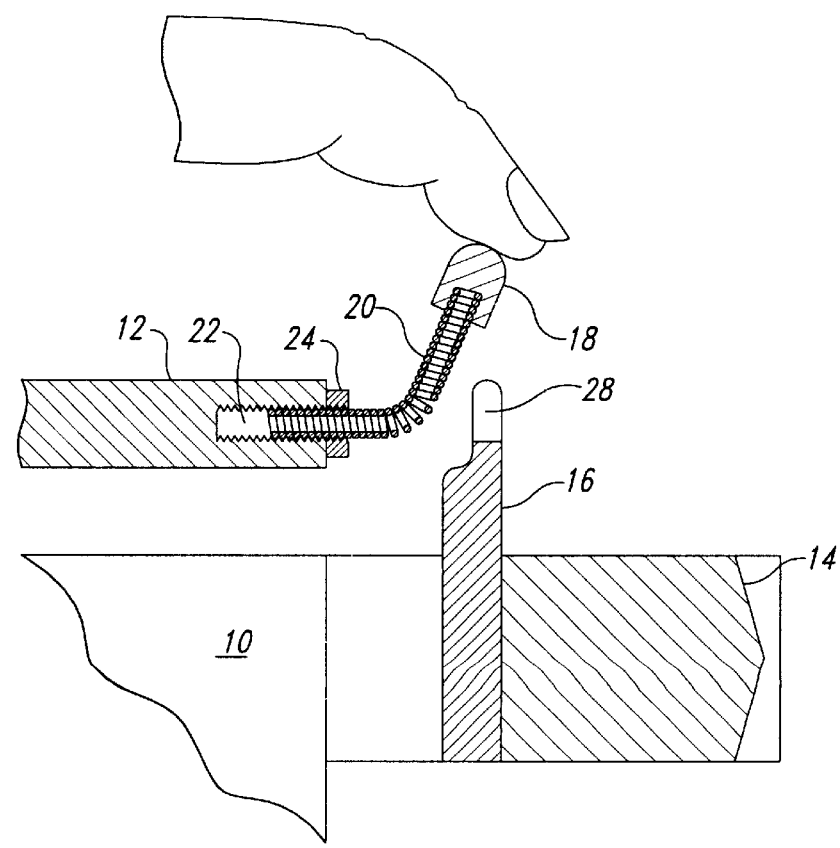
FIG. 4 shows the board in correct alignment within the frame, with the fastener flexed away from a flange in the board.

FIG. 4 shows the fastener 20 in flexed condition, as would be used to engage or disengage the fastener. In contrast to the use of screws, the flexible fastener can be engaged without tools in the time it takes to lift the head end of the fastener and drop it into the slot in the flange.

The method of inserting the computer board into the frame and holding it with the fastener may be carried out by the following technique. The computer board 10 is positioned for sliding into place within the frame 12. As the board 10 is slid into position, the head 18 of the fastener is flexed upward, as shown in FIG. 4. The board is advanced until it is fully inserted into the frame with the slot 17 of the flange 16 in the proper position to align with the body 20 of the fastener. Once the board is in the proper position, the head 18 is released so that it automatically engages the slot 17 and the head abuts against the flange 16 for holding it in the proper position. The top edge 28 of the flange 16 is rounded so that the head may easily enter the slot and then flex outward slightly so as to exert a force on the flange 16 and draw it towards the frame 12. The user can determine, by visual inspection alone, whether a fastener is properly engaged.

In one embodiment, the length of the fastener 20 will be selected when initially installed to be just shorter than that required to engage the flange 16 with the spring in the rest position. In such a case, then the user installs the fastener in the flange 16 by the same technique of lifting it upward and in addition, gripping the head 18 and slightly extending the spring 20 to increase its length sufficient to enter the slot 17. The installation of the fastener in the flange 16 therefore occurs very quickly, with no need for the use of a special tool, such as a screwdriver to torque wrench, and without the need for excessive trouble or measurements. Indeed, all a user need do is lift, slightly stretch the spring, and place it in position in the slot 17. The board is assured of being held properly in position each time, without the need for expensive torque measurements when installing the fastener since the spring will automatically provide a preset amount of force holding the board in position.

When it is desired to remove the board 10, the user merely raises head 18, to withdraw it from the slot 17. The spring will easily flex upward, out of position, so as not to be in engagement with the flange 16 and the board 10 can easily be removed.

The fastener can be affixed to the frame in the factory and does not require particular care or attention during final assembly of the computer. The technician engages each fastener once during assembly, and can determine visually that all fasteners are engaged.

In this embodiment of the invention, the body of the fastener is a spring. This is not intended to limit the scope of the invention, but to describe the characteristics of the body. Any material or design that fulfills the functions of the fastener as described above is considered to be equivalent, and within the scope of this invention.

Figure 5:
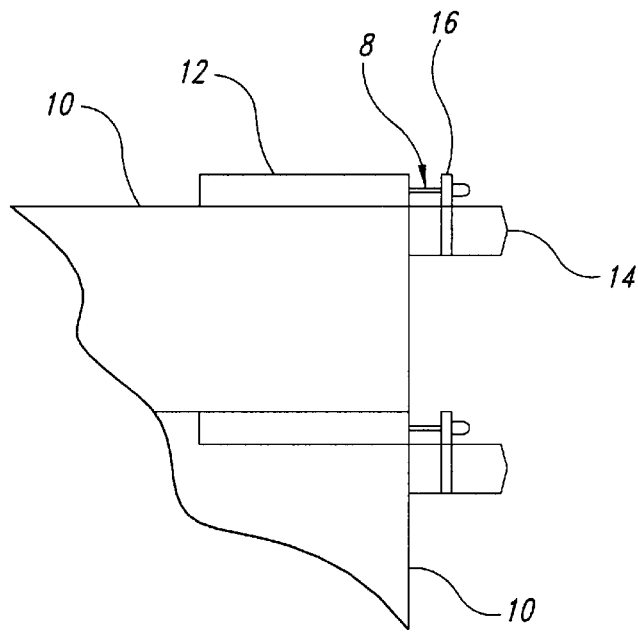
FIG. 5 shows a plan view of two boards in correct alignment, one above the other in the frame.

FIG. 5 shows a frame holding two circuit board modules, held in position by flexible fasteners. As may be appreciated, large computer systems may incorporate many subsystems or modules of various sizes. As has been described previously, flexible fasteners can be designed to accommodate a wide range of requirements, which may include differences in size, length or tensile strength. There will also be situations where the use of two or more fasteners is appropriate. Fasteners may be used to apply force in opposite directions or at right angles to each other, or in other configurations, as required by the requirements of the particular application. All of these variations are considered to fall within the scope of this invention.

Figure 6:
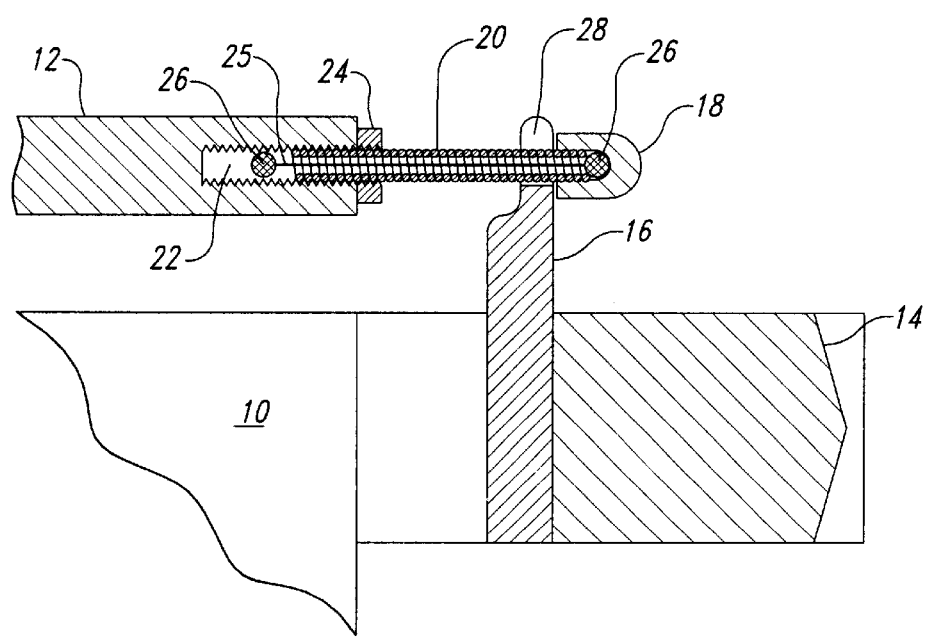
FIG. 6 shows an embodiment of the invention in which an internal wire is used to prevent over extension of the fastener.

FIG. 6 shows a second embodiment of the fastener, in which a wire core 25 is used as a safety to prevent hyperextension of the fastener. The wire has a stop 26 at each end that will engage each end of the body of the fastener when the fastener is extended to its maximum allowable length. The length of the wire is selected to permit normal operation of the fastener and movement in the structure, but to prevent extension beyond a point which might result in damage to the fastener or failure of the connections in the system employing the fastener.

The fail safe may comprise a wire with metal beads affixed to each end. The beads may be affixed by crimping, welding or any other means that serve to securely fasten them to the wire. The structure described is one possible fail safe, but any structure or method that serves to limit the extension of the body of the fastener is considered equivalent, and is within the scope of this invention.

The above examples are for illustrative purposes only, and are not intended to limit the scope of the patent. An individual with reasonable skill in the art might find many other applications for the flexible fastener, and, in the process, make modifications and variations to the fastener described and illustrated herein, without thereby departing from the scope of the present invention.

What is claimed is:

1. A flexible fastener comprising:
   a tightly coiled wire forming a spring as the body of the fastener;
   a head, affixed to a first end of said body;
   a first structure, having a threaded aperture therein, the fastener being coupled to the first structure by the second end of the body of the fastener being within the threaded aperture; and
   a locknut, threaded onto said body.

2. The fastener according to claim 1, wherein said head has a greater diameter than said body.

3. The fastener according to claim 1 wherein said head is affixed to said body via a threaded aperture on said head that matches the pitch of said tightly coiled wire, and into which is threaded said body.

4. The fastener according to claim 1, wherein said tightly coiled wire may be coiled in a right hand or left hand direction.

5. The fastener according to claim 1, wherein said fastener is of sufficient flexibility longitudinally and laterally to allow limited movement between said first structure and said second structure.

6. The flexible faster of claim 1, further comprising safety means for preventing the faster from extending beyond a desired limit.

7. The flexible fastener of claim 6 wherein the safety means is a wire core having knobs at extreme ends thereof, the core being longer in length than the body of the fastener, the length of the core being selected such that extension of the body to a desired limit will cause the knobs to engage the first and second ends of the body, preventing thereby further extension of the fastener.

8. The fastener according to claim 1, wherein said pitch of said tightly coiled wire matches the pitch of the threaded aperture on said first structure, into which is threaded said body.

9. The fastener according to claim 1, wherein said first structure is maintained in mechanical contact with a second structure by said fastener.

10. The fastener according to claim 9, wherein said body passes through a slot in a flange on said second structure, while said head engages said slot.

11. The flange according to claim 10, wherein said slot is of sufficient width to admit said body while narrow enough to prevent passage of said head.

12. The fastener according to claim 10, wherein said body is of sufficient flexibility in a direction perpendicular to its longitudinal axis as to require little effort to engage or disengage from said slot.

13. The fastener according to claim 9, wherein said body is of sufficient length and tension along its longitudinal axis to maintain physical contact between said first structure and said second structure.

14. The fastener according to claim 13, wherein said length of said body may be adjusted by threading it to a greater or lesser depth within said threaded aperture in said first structure.

15. The fastener according to claim 14, wherein said locknut locks said body to said first structure at said sufficient length.

16. A method for maintaining multiple mechanical structures in physical contact, comprising;

providing an aperture in a first structure and affixing a fastener within said aperture;

providing a flange on a second structure with a slot to receive said fastener; and providing a locknut on said fastener.

17. The method according to claim 16, wherein said fastener is comprised of a body of coiled wire and a head affixed to the exposed end thereof.

18. The method according to claim 16, further including the steps of:

bringing said first structure into close proximity with said second structure;

manually flexing said fastener in a direction perpendicular to its longitudinal axis; and releasing said fastener such that it traverses said slot in said flange.

19. The method according to claim 18, wherein said traverse results in said body of said fastener laying within said slot, with said first structure on a first side of said flange, and said head of said fastener on a second side of said flange.

20. A method for maintaining a first structure affixed to a second structure comprising:

threading a fastener into an aperture of a first structure, the fastener having a body composed of a coil spring; and affixing a head of the fastener in an abutting relationship to a flange on the second structure so the head retains the second structure in a compressed, retained relationship with respect to the first structure; and rotating a locknut positioned on the threaded fastener until the locknut contacts the first structure in an abutting relationship;

tightening the locknut against the first structure around the body of the threaded fastener so as to lock the threaded fastener and prevent rotation of the fastener with respect to the frame.

21. The method according to claim 20 wherein said step of placing the fastener in an abutting relationship to the second structure comprises:

flexing the spring in a direction perpendicular to its longitudinal axis, moving the second structure into a selected position with respect to the first structure; and releasing the spring so that it returns to a straight, longitudinally extending position with the head positioned in a slot of the second structure abutting against a flange.

22. A fastener, comprising:

a body formed of a tightly coiled wire;

a head affixed to a first end of the body; and a computer frame assembly having an threaded aperture into which is threaded a second end of the body.

23. The fastener of claim 22 wherein the head is attached to the body via a threaded aperture in the head and into which is threaded the first end of the body.

24. The fastener of claim 22 wherein a desired length of the body may be selected by threading the second end of the body more or less deeply into the threaded aperture.

25. The fastener of claim 22, further comprising a structure held in contact with the frame assembly by the body and head, wherein the head engages a flange on the structure, and wherein the body may be flexed away from the flange, releasing thereby the structure from contact with the frame assembly.

26. The fastener of claim 25 wherein the structure includes a component of a computer system.

27. The fastener of claim 22, further including a locknut on the body.

28. The fastener of claim 27 wherein the body may be locked at a desired length by rotating the locknut to bear against the first structure.

29. The fastener of claim 22, further comprising safety means for preventing the body from extending beyond a desired limit.

30. The fastener of claim 29 wherein the safety means is a wire core having knobs at extreme ends thereof, the core being longer in length than the body of the fastener, the length of the core being selected such that extension of the body to a desired limit will cause the knobs to engage the first and second ends of the body, preventing thereby further extension of the fastener.

31. A fastener, comprising:

a body formed of a coiled wire;

a head affixed to a first end of the body;

a structure having a threaded aperture of a first depth into which is threaded a second end of the body to a selected depth less than the first depth;

a locknut threaded onto the body.

32. The fastener of claim 31 wherein the selected depth is adjustable by threading the second end of the body more or less deeply into the aperture.

33. The fastener of claim 31 wherein the locknut is rotated to bear against the first structure.

34. The fastener of claim 31 wherein the threaded aperture has a constant diameter for the first depth.

* * * * *